United States Patent
Callahan

(10) Patent No.: US 8,864,171 B1
(45) Date of Patent: Oct. 21, 2014

(54) SCOOTER FOR A HANDICAPPED CHILD

(71) Applicant: Christopher Charles Callahan, Ronkonkoma, NY (US)

(72) Inventor: Christopher Charles Callahan, Ronkonkoma, NY (US)

(*) Notice: Subject to any disclaimer, the term of this patent is extended or adjusted under 35 U.S.C. 154(b) by 0 days.

(21) Appl. No.: 13/966,246

(22) Filed: Aug. 13, 2013

Related U.S. Application Data

(60) Provisional application No. 61/682,611, filed on Aug. 13, 2012.

(51) Int. Cl.
  *B62D 61/04* (2006.01)
  *B62K 5/007* (2013.01)

(52) U.S. Cl.
  CPC ..................... *B62K 5/007* (2013.01)
  USPC .............. 280/755; 180/24.01; 180/220

(58) Field of Classification Search
  CPC ...... A63C 17/01; A63C 17/12; A63C 17/002; A63C 17/0033; B62K 3/002; B62K 5/023; B62K 5/025; B62K 5/007; B62K 5/05
  USPC ......... 180/220, 215, 209, 22, 24.01; 280/755, 280/87.041, 87.042
  See application file for complete search history.

(56) References Cited

U.S. PATENT DOCUMENTS

| | | | |
|---|---|---|---|
| 6,161,860 A * | 12/2000 | Corneau | 280/642 |
| D445,145 S | 7/2001 | Yang | |
| 6,343,798 B1 | 2/2002 | Chen et al. | |
| 6,609,584 B2 * | 8/2003 | Patmont et al. | 180/220 |
| 7,458,435 B2 * | 12/2008 | Negoro et al. | 180/180 |
| 2004/0245744 A1 * | 12/2004 | Emang et al. | 280/281.1 |
| 2005/0064998 A1 * | 3/2005 | Hill | 482/57 |
| 2006/0035760 A1 * | 2/2006 | Hill | 482/57 |
| 2010/0244421 A1 * | 9/2010 | Flowers | 280/755 |
| 2011/0133420 A1 * | 6/2011 | Smith | 280/87.042 |
| 2012/0161409 A1 * | 6/2012 | Young | 280/87.042 |

OTHER PUBLICATIONS

Razor E200 E200s Owner's Manual—12 pages, for the scooter that the present invention is a modification of, filed herewith as: E2XX_Manual_US_Folding_Version1_01-10_US.pdf.

* cited by examiner

*Primary Examiner* — Ruth Ilan
*Assistant Examiner* — Darlene P Condra
(74) *Attorney, Agent, or Firm* — Collard & Roe, P.C.

(57) ABSTRACT

A scooter, for a handicapped person, has a platform. A front wheel is steerably mounted at a front of the platform. A rear drive wheel is mounted at a back of the platform. A motor is connected to drive the drive wheel. There is a power source for the motor. A pair of protective skirts are mounted to the sides of the platform. A pair of casters are mounted below the platform, at the lateral edges of the platform. The casters are within the protective skirts. The casters are protected by the protective skirts.

11 Claims, 19 Drawing Sheets

SCOOTER FOR A HANDICAPPED CHILD

RELATED APPLICATION

This application is a non-provisional utility patent application, under 35 U.S.C. 119(e), taking benefit and priority of provisional patent application 61/682,611, filed Aug. 13, 2012, entitled: Scooter for A Handicapped Child.

FIELD OF INVENTION

This application relates to a scooter for the handicapped.
There are various vehicles used to provide mobility to various persons having various handicaps.

BACKGROUND OF THE INVENTION

The scooter described in this application is a modification of a conventional RAZOR® E200 electric two-wheeled scooter.

BRIEF DESCRIPTION

The inventor has modified a conventional RAZOR® E200 electric two-wheeled scooter, in a way that makes it particularly suited for handicapped child.

DETAILED DESCRIPTION OF THE DRAWINGS

Figure 1:
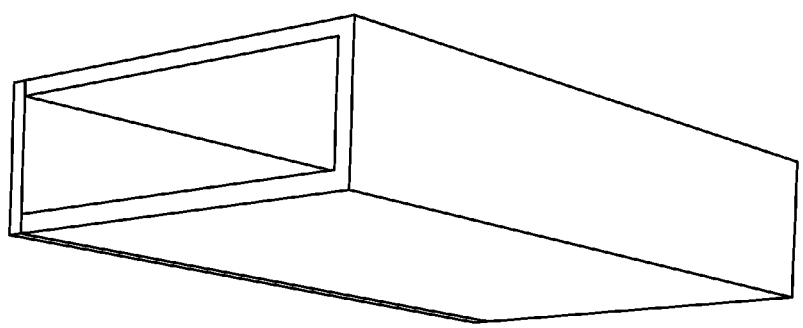
FIG. 1 is a perspective view of brake assembly parts.
Figure 1:
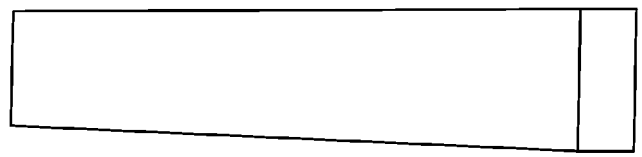
Figure 1:
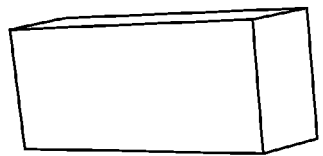
Figure 1:
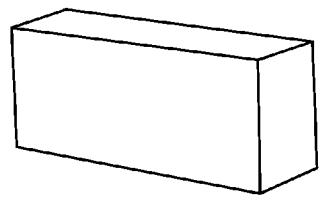

The scooter invented by the present applicant is a scooter for the handicapped. It is particularly suited for handicapped children.

The applicant modified a conventional RAZOR® E200 electric two-wheeled scooter—modified it for use by his own handicapped child. An owner's manual for the Razor E200 scooter was submitted with the provisional application, and is hereby incorporated by reference into this application.

The inventor has a handicapped child. The inventor has found that a big limitation is our structural and physical environment. Problems with endurance and balance:
prevent participation in the world,
prevent exploration of our world, and
limit a child's ability to engage in childhood activities.

The scooter described herein is an electric powered scooter designed for children. The inventor has redesigned and modified a conventional RAZOR ® E200 electric two-wheeled scooter, adapting the scooter for children with disabilities—from four years of age and up. Use of the scooter depends on the user's cognitive ability, visual acuity, judgment, and reaction time. The scooter increases mobility for the child, and assures access to all areas. The child's peers perceive it as "cool". The scooter sparks conversations, which promote social interactions and friendships.

The inventor started with a conventional electric powered sit/stand scooter. The inventor added:
a platform,
the skirt, and
casters to increase stability.

The platform enables a child to balance and provides a place to plant his feet securely. The platform provides a wider base for feet, than is provided by the conventional scooter. The platform also provides a place to safely position and install casters. A skirt is also added as a safety precaution, to prevent objects or people from being run over, or getting stuck under the scooter.

An adjustable seat was added that adjusts for growth in the user. As the child grows, the seat can be adjusted to accommodate that growth. The Inventor widened the seat, to distribute the child's weight, and to decrease pressure on the user's sitting pressure points.

The Inventor changed handlebars to adjust for children with disabilities. These adjustable handlebars provide the ability to raise or lower, depending on whether the child is sitting or standing. Handlebars can be adjusted to a comfortable height or angle, to meet the needs of a specific child. The adjustable handlebars also allow for growth of the child.

The inventor changed the throttle and throttle control board. The standard scooter comes with an on-off throttle. The variable speed throttle of the present invention allows speed changes, depending on the environment the child is using scooter in. The Inventor also changed the throttle control board to accommodate the variable-speed throttle.

The Inventor added a back rest for support. This backrest provides support for children with poor postural control or weaker postural muscles.

The Inventor also added a seat belt, both for safety and to retain a child on the seat if the child has balance or strength problems.

Users with the following diagnoses and disabilities would particularly benefit from the scooter:
Ducheene Muscular Dystrophy;
Muscular Dystrophy;
Cerebral Palsy—mild;
Hypotonia;
Cystic Fibrosis;
Pulmonary Conditions which limit walking;
Cardiac Conditions which limit walking;
Spina Bifida;
SMA;
Paraplegia;
Transverse Myolitis;

Cancer;
Leukemia;
Little People;
Lupus;
Arthrogyroposis;
Epidermolysis Bullosa;
Stroke;
Club Foot or Club Feet.

Persons with other conditions can also benefit. The above list is not exhaustive. We have only named a few.

A child of four has successfully used to the scooter.

The scooter can be used by children with a variety of disabilities, as early as their cognitive abilities, visual acuity, judgment, and reaction time permit.

This scooter provides a "cool" means of access into the community. Our experience as parents of a child with Ducheene Muscular Dystrophy is that the view and perception of our son, by people without disabilities, is different, from that of a child in a wheelchair or a child using an adult scooter. Our son loves to drive this scooter, because of the positive attention that he gets. It gives him the confidence that at times is hard to find, because his diagnosis has made simple childhood activity, of walking a distance, or keeping up with peers, a challenge. Now he keeps up with his peers and engages with more confidence, as all his friends want a scooter like his daddy made for him.

Below are some of the specific modifications, made to the Razor scooter:

Inventor added a rear handle picking up the scooter.
The standard location of the power switch was moved.
The charging port was moved.
The Inventor added a three-position switch for reverse.
The present embodiment comprises a foot brake. However, depending on the child's disability and strength, the brake can be hand or foot position appropriate.
Inventor added a variable throttle speed control that could be adjusted for a maximum speed limit.

Figure 16:
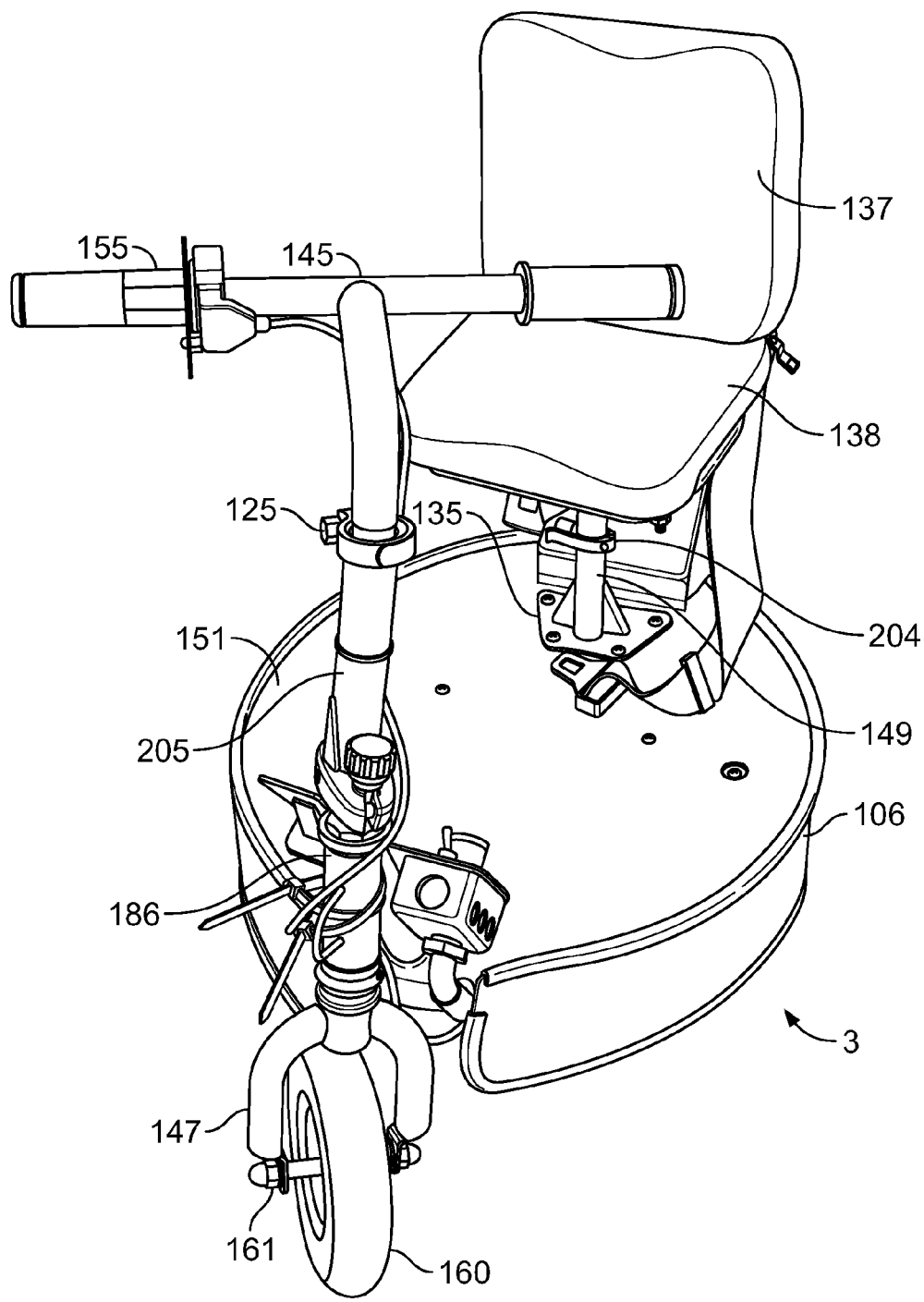
FIG. 16 is an upper front perspective view of the assembled scooter.

FIG. 16 is an upper front perspective view of the assembled scooter, generally designated 3.

FIG. 1 is a perspective view of brake foot pedal 87. This embodiment of the pedal is made of aluminum. A foot pedal is provided for children:
with more strength in their feet than in their hands,
with hand deformities or
children who are of a small size.

Figure 2:
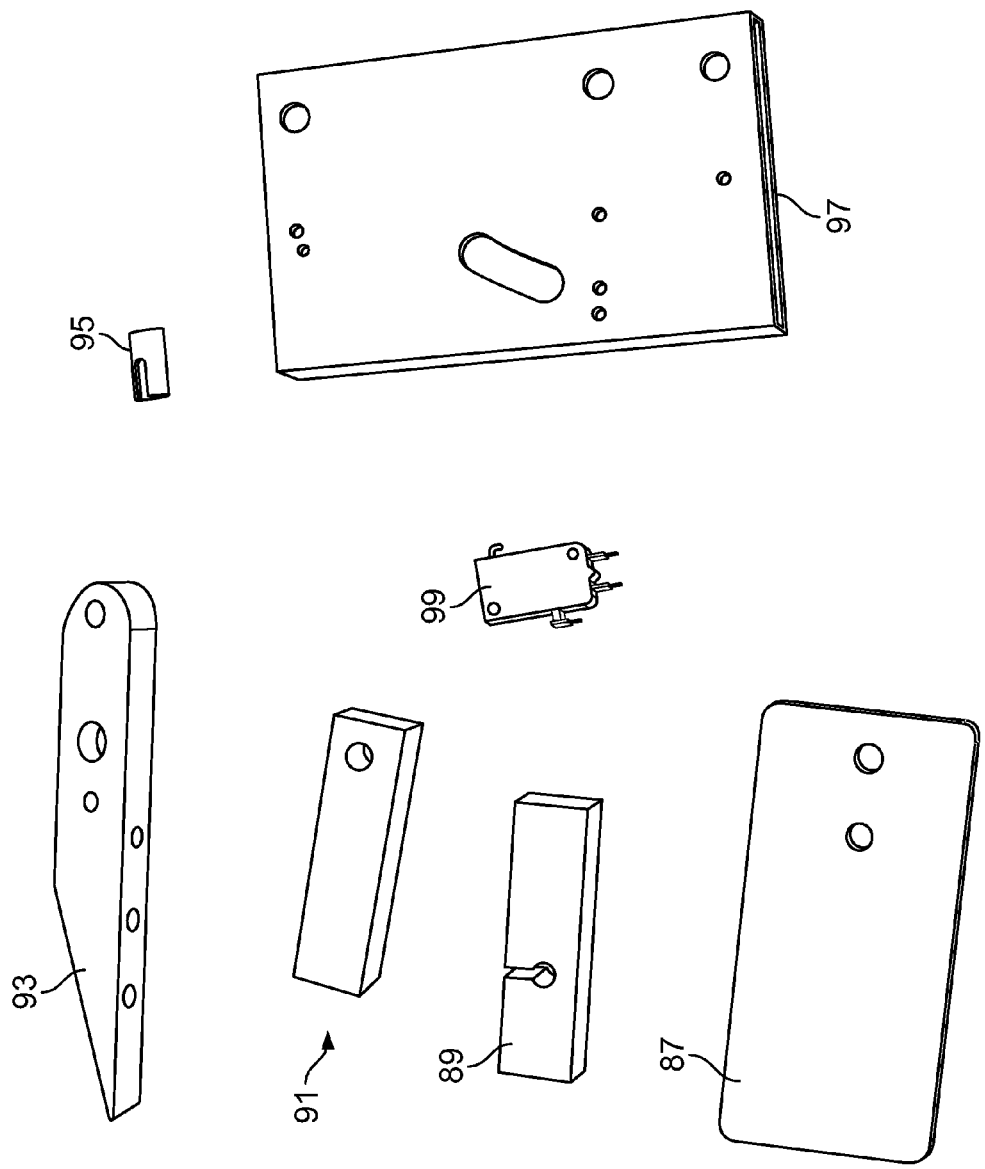
FIG. 2 shows more brake parts.

FIG. 2 shows more brake parts. These parts include a brake cable holder 89, which holds the brake cable in the brake assembly. The presently preferred embodiment is Aluminum. End cap 91, keeps dirt and debris out of the brake assembly. The presently preferred embodiment is Aluminum. Brake pedal stem 93 holds the pedal 87 and cable and hinges on the assembly. The presently preferred embodiment is Aluminum. Cable eyelet 95 holds the cable from going through the assembly. Eyelet 95 is aluminum. Brake housing 97 holds all the brake parts together. The presently preferred embodiment is Aluminum. There is a normally open/normally closed contact 99.

Figure 3:
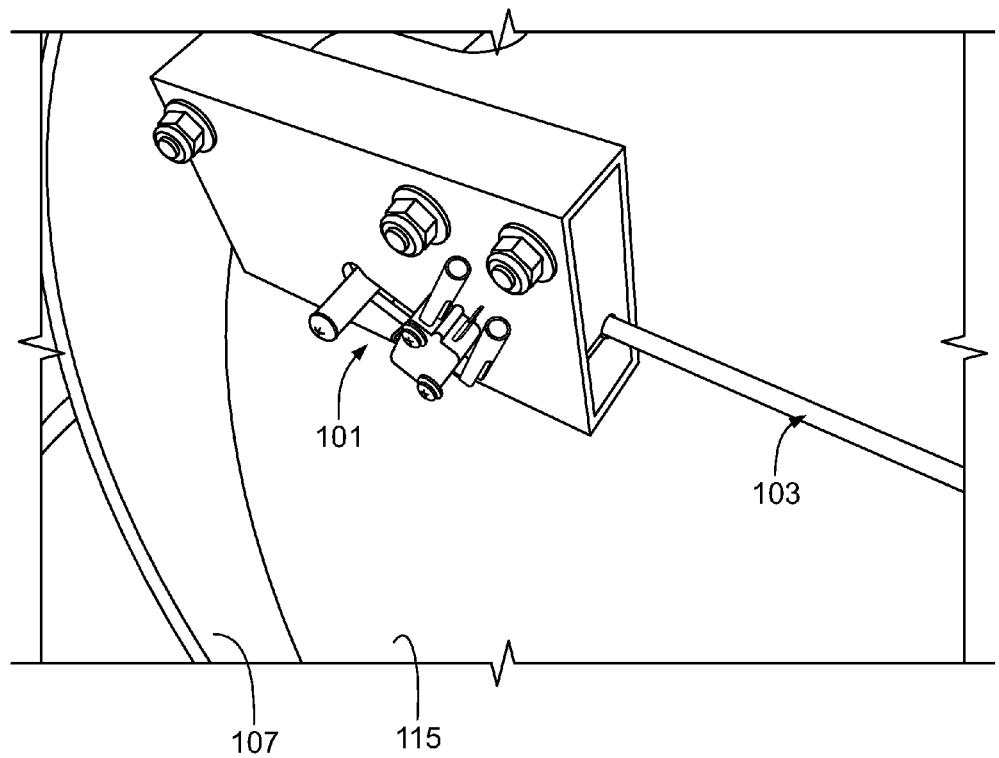
FIG. 3 shows the assembled brake assembly.

FIG. 3 shows the assembled brake assembly 101 mounted on platform 115. Brake cable 103 is mounted to brake assembly 101, and is used to actuate the brake.

Figure 4:
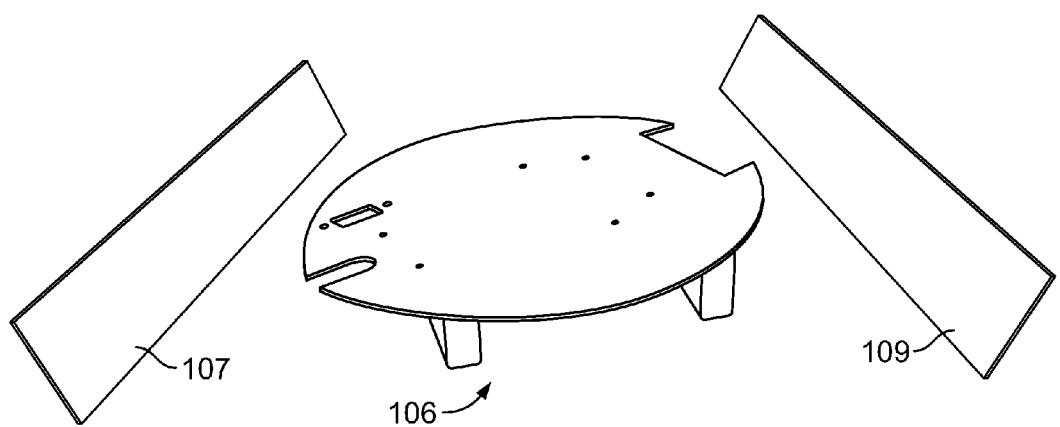
FIG. 4 shows platform prior to assembly.

FIG. 4 shows platform 106 prior to assembly.

Figure 5:
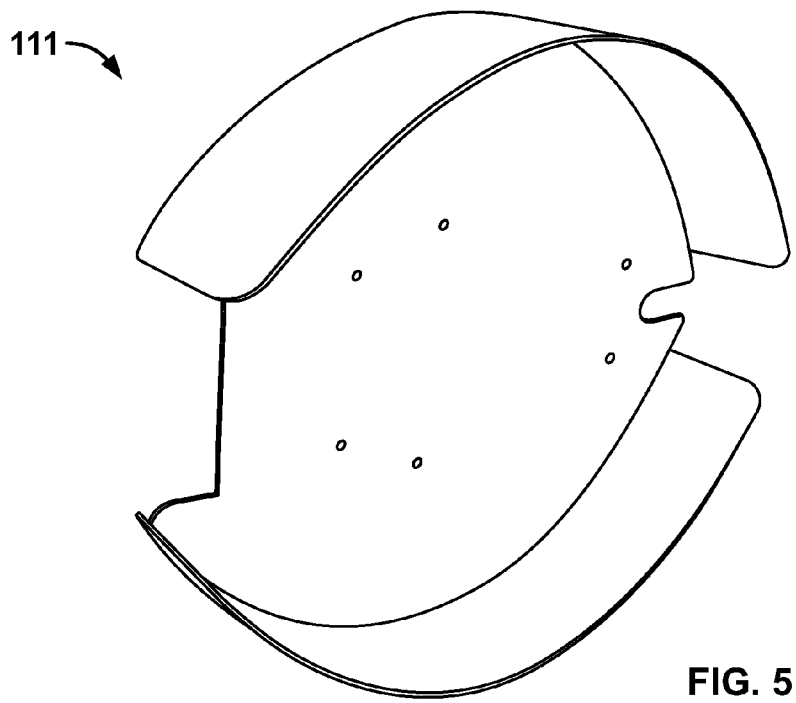
FIG. 5 shows platform welded into a unitary piece.

FIG. 5 shows platform 111 welded into a unitary piece.

Figure 6:
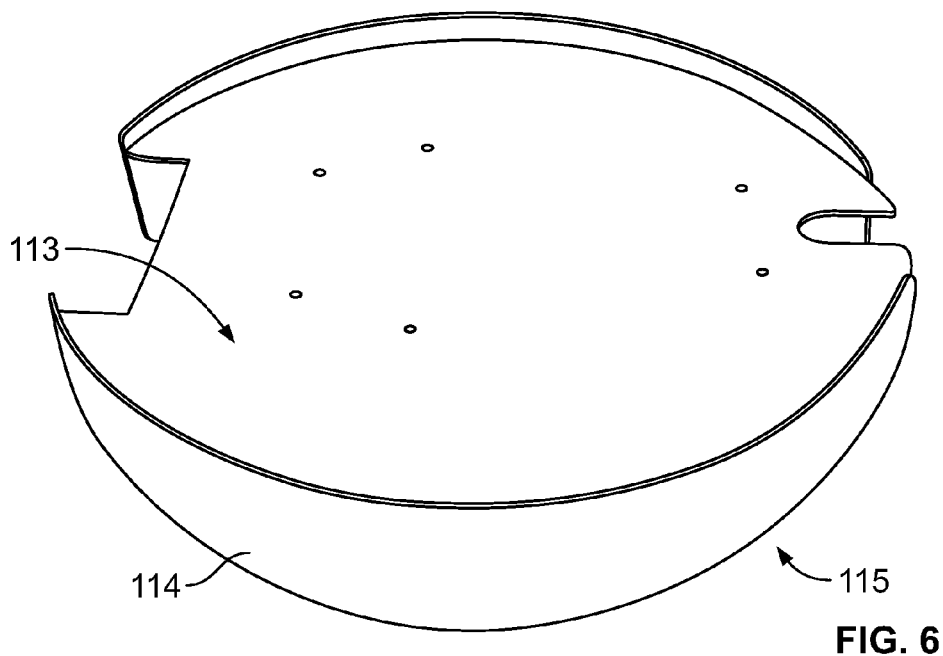
FIG. 6 is a top right side perspective view thereof.

FIG. 6 is a top right side perspective top 113 of the platform 106 including side skirts 114, which together comprise the platform assembly 115.

Figure 7:
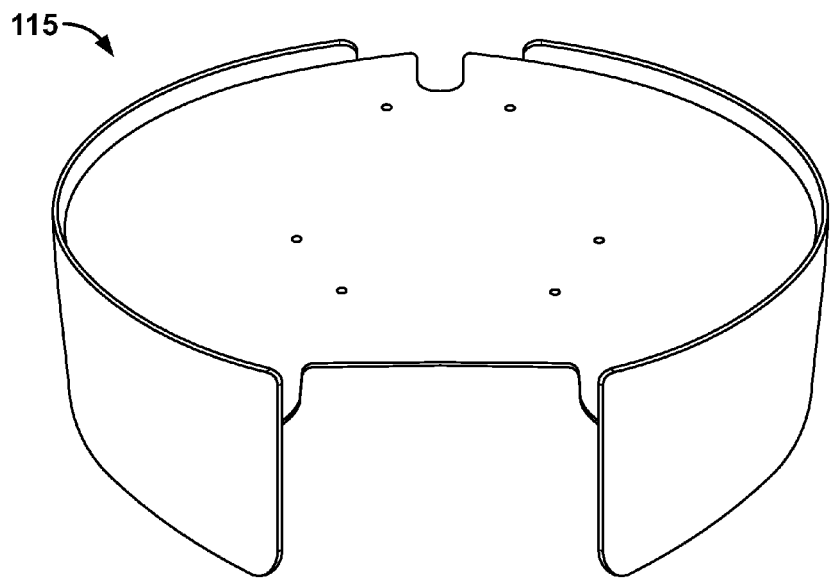
FIG. 7 is a top rear perspective view thereof.

FIG. 7 is a top rear perspective view of the platform assembly 115.

Figure 8:
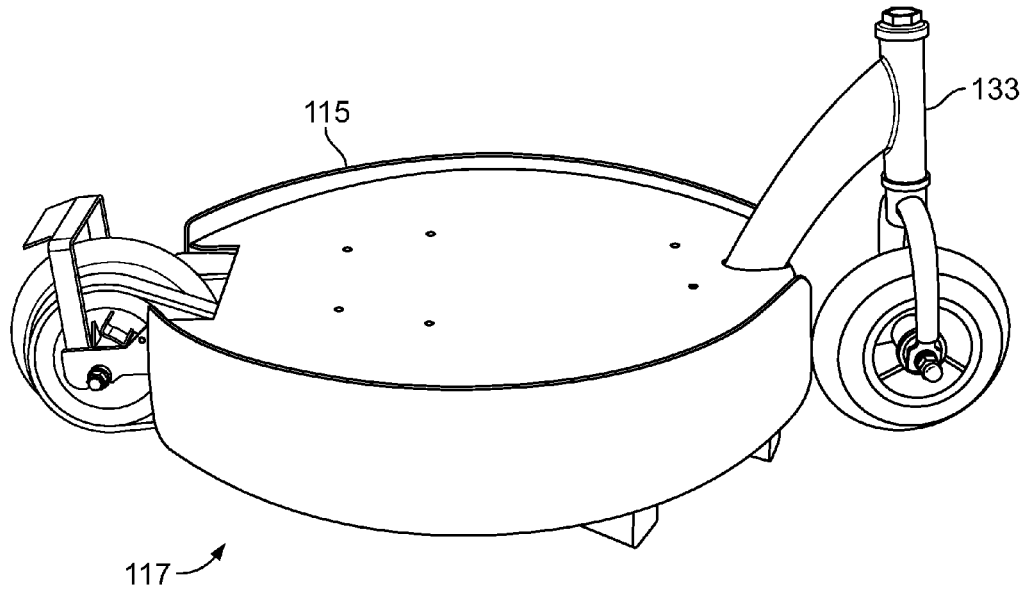
FIG. 8 shows a scooter frame fitted to the platform.

FIG. 8 shows a scooter frame 133 bolted to the platform 115 to form scooter chassis 117.

Figure 9:
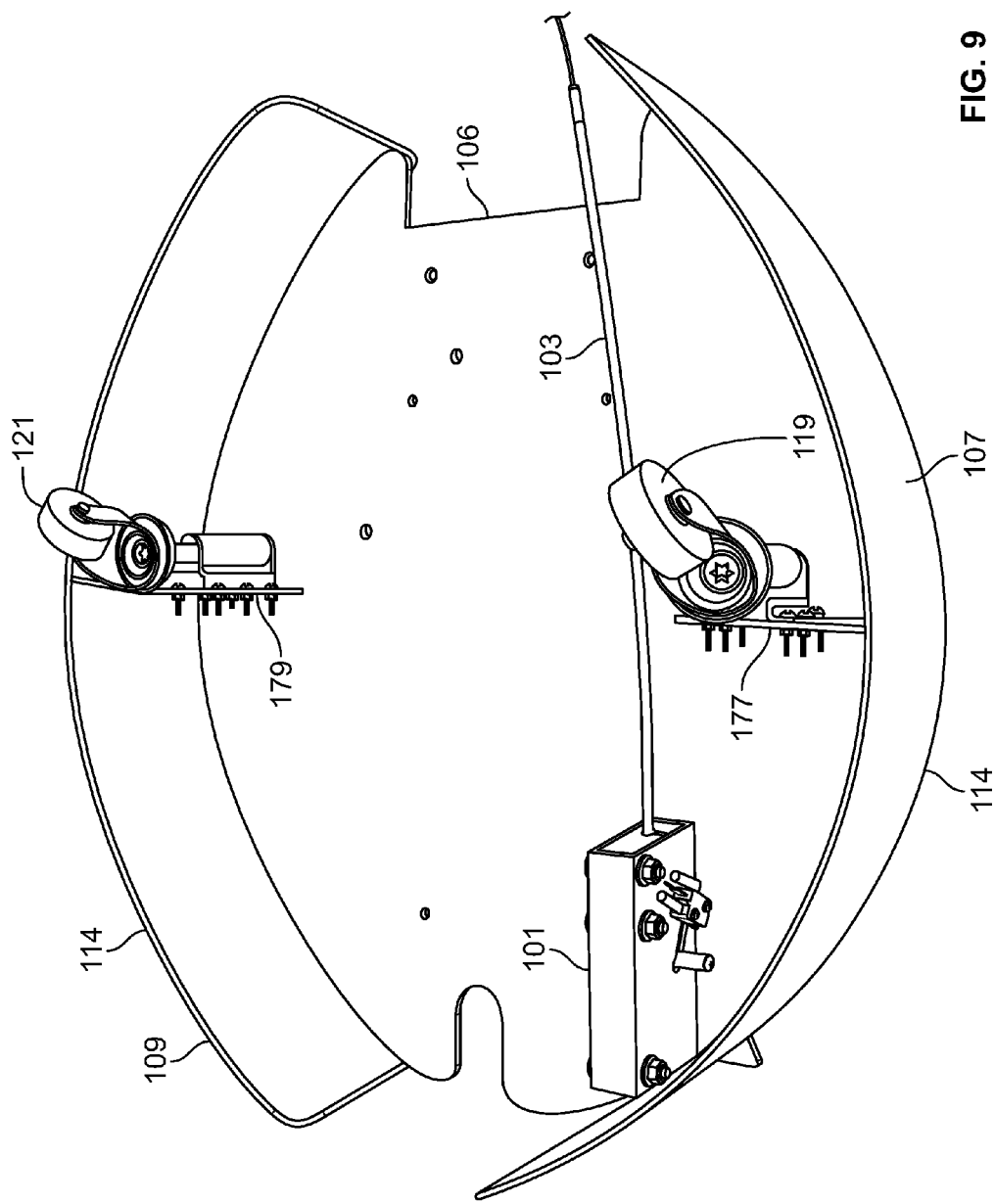
FIG. 9 is a left bottom perspective view thereof showing casters and the brake line assembled to the platform.

FIG. 9 is a left bottom perspective view thereof showing casters 119 & 121 and the brake cable 103 assembled to the platform 106. Casters 119 & 121 are joined to skirts 114 and platform 106 by bulkheads 177 & 179 which provide a strong and stable attachment between casters 119 & 121 and skirts 114 comprising side panels 107 & 109, and platform 106. The casters 119 & 121 stabilize the weight of the driver, and keep the scooter 3 upright, whether or not the driver is capable of riding a two-wheeled scooter.

Figure 10:
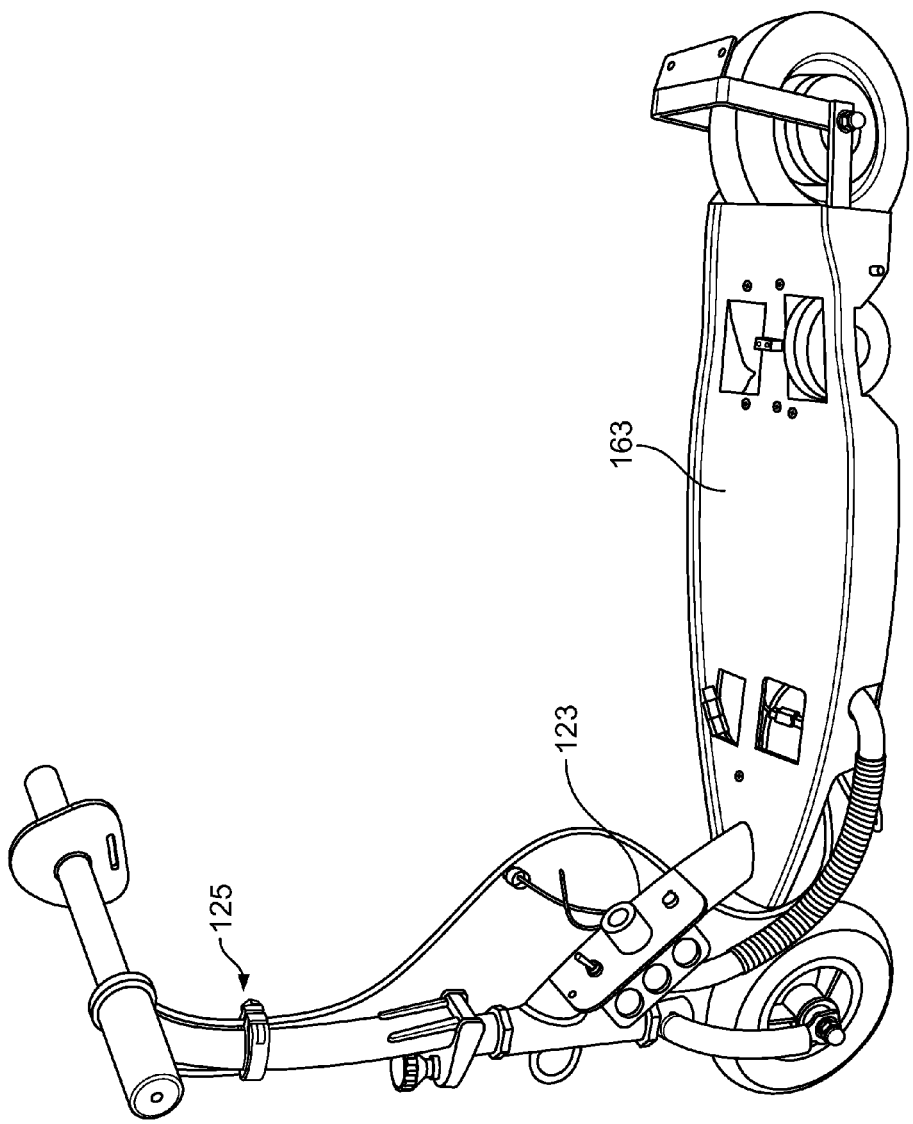
FIG. 10 is an upper left side perspective view of the RAZOR® E200 scooter modified with a dashboard and adjustable handlebars.

FIG. 10 is an upper left side perspective view of the RAZOR® E200 scooter 133, modified with a dashboard 123 and adjustable handlebars 125.

Figure 11:
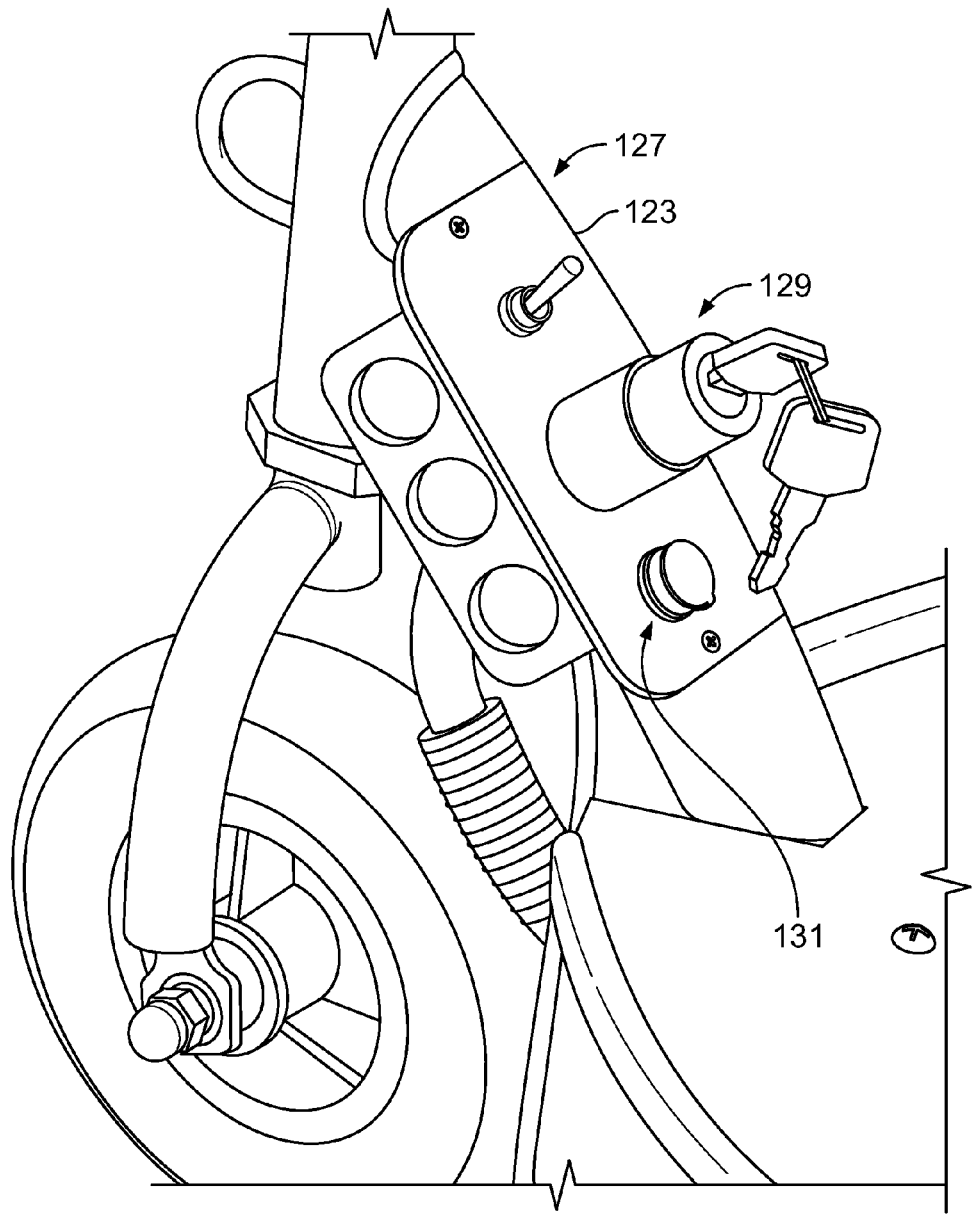
FIG. 11 is a detailed perspective view of the dashboard.

FIG. 11 is a detailed perspective view of the dashboard 123, including 20 ampere two-position toggle switch 127, 20 Ampere direct current key-switch 129, and recharging port 131.

Figure 12:
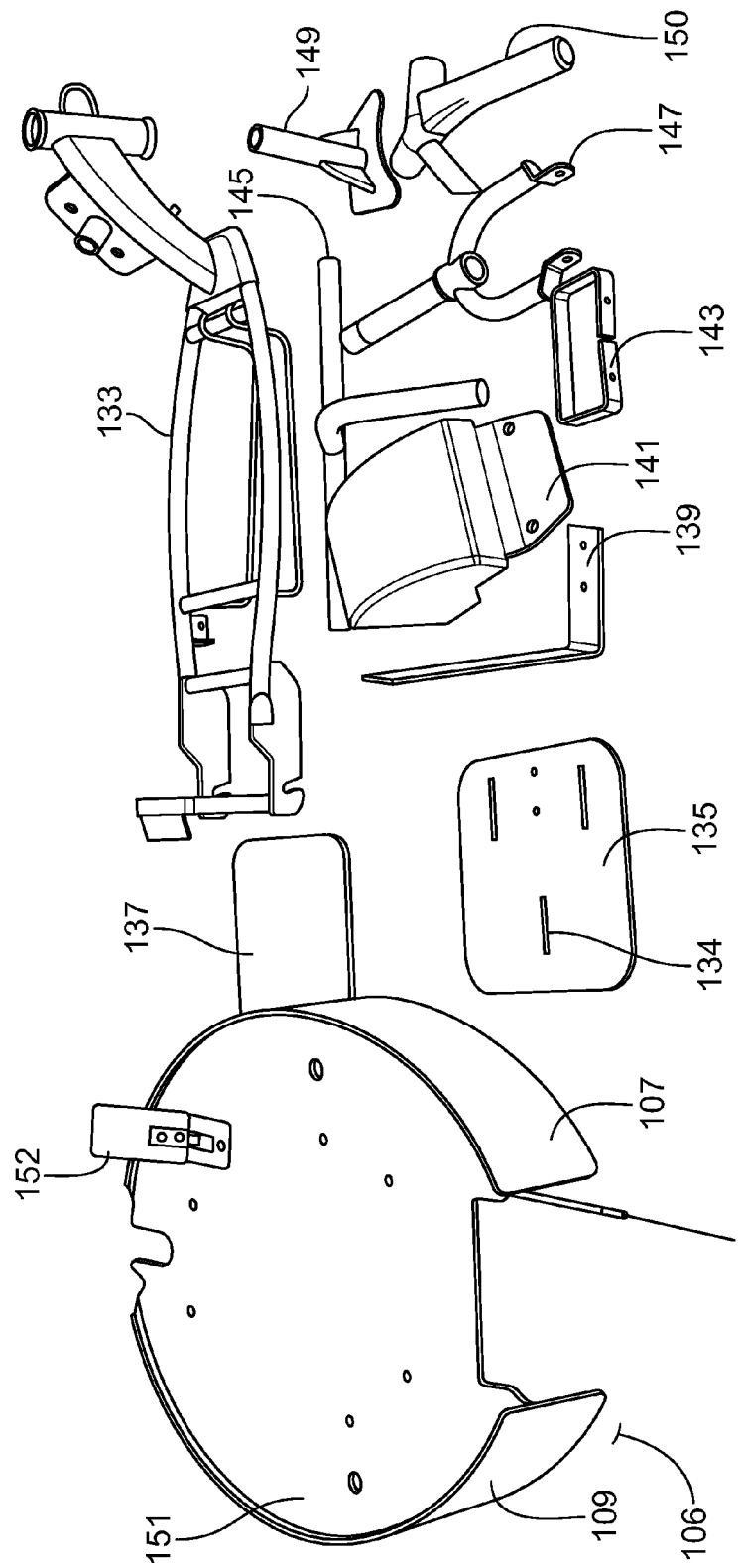
FIG. 12 is an exploded view of many of the larger components.

FIG. 12 is an exploded view of many of the larger components. These include: platform 106, right side 107, and left side 109 of platform 106. Baseplate 151 is assembled to brake pedal 152.

Three screw slots 134 are part of seat plate 135. Seat plate 135 is screwed through these three slots to base plate 151. If the screws are loose, the fore & aft position of the seat can be adjusted. Once correct, the screws are tightened to hold the seat 138 (FIG. 16) in place. Seat post base 149 (FIG. 12) is bolted to seat plate 135. Adjustable seat post 150 slidably mounts within seat post base 149. Clamp 204 releasably squeezes the base 149 (FIG. 16) to immobilize seatpost 150 and thereby set the seat's 138 height. The seat 138 is larger than the standard Razor seat. Seat 138 is mounted to the adjustable seat post 150. Back rest 137 is mounted by support 139 for back rest 137 to the seat 138 or to the seat post 150.

Figure 13:
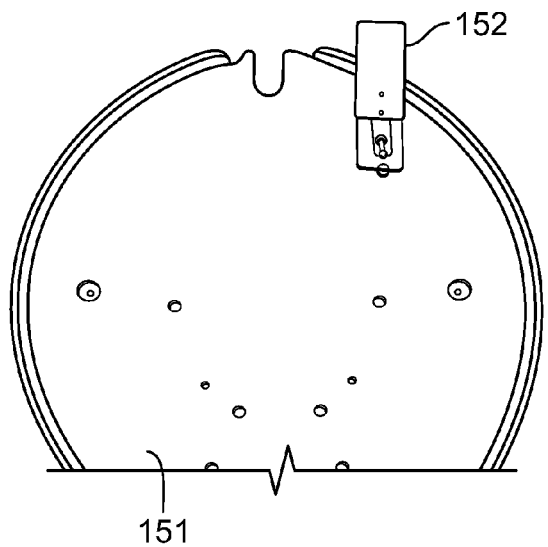
FIG. 13 is an upper perspective view from behind of the platform with holes drilled and a brake pedal installed.

FIG. 13 is an upper perspective view from behind of the platform 151 with holes drilled and a brake pedal 152 installed.

Figure 14:
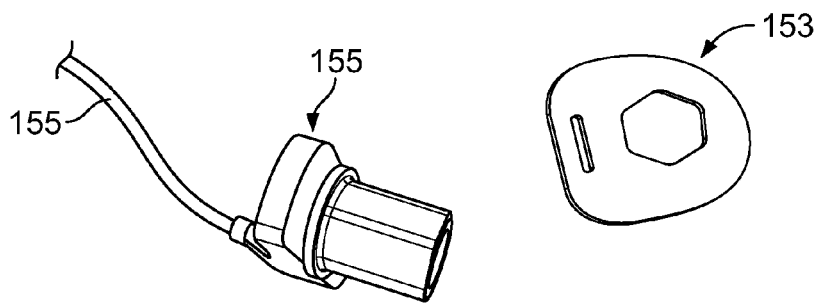
FIG. 14 is an exploded view of throttle parts.

FIG. 14 is an exploded view of throttle parts: including throttle governor 153 and adjustable throttle 155.

Figure 15:
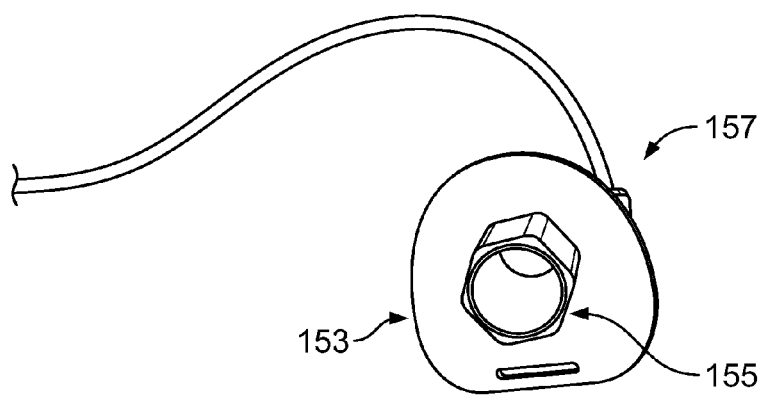
FIG. 15 is a perspective view of the throttle.

FIG. 15 is a perspective view of the throttle assembly 157, including throttle governor 153 and adjustable throttle 155.

Figure 17:
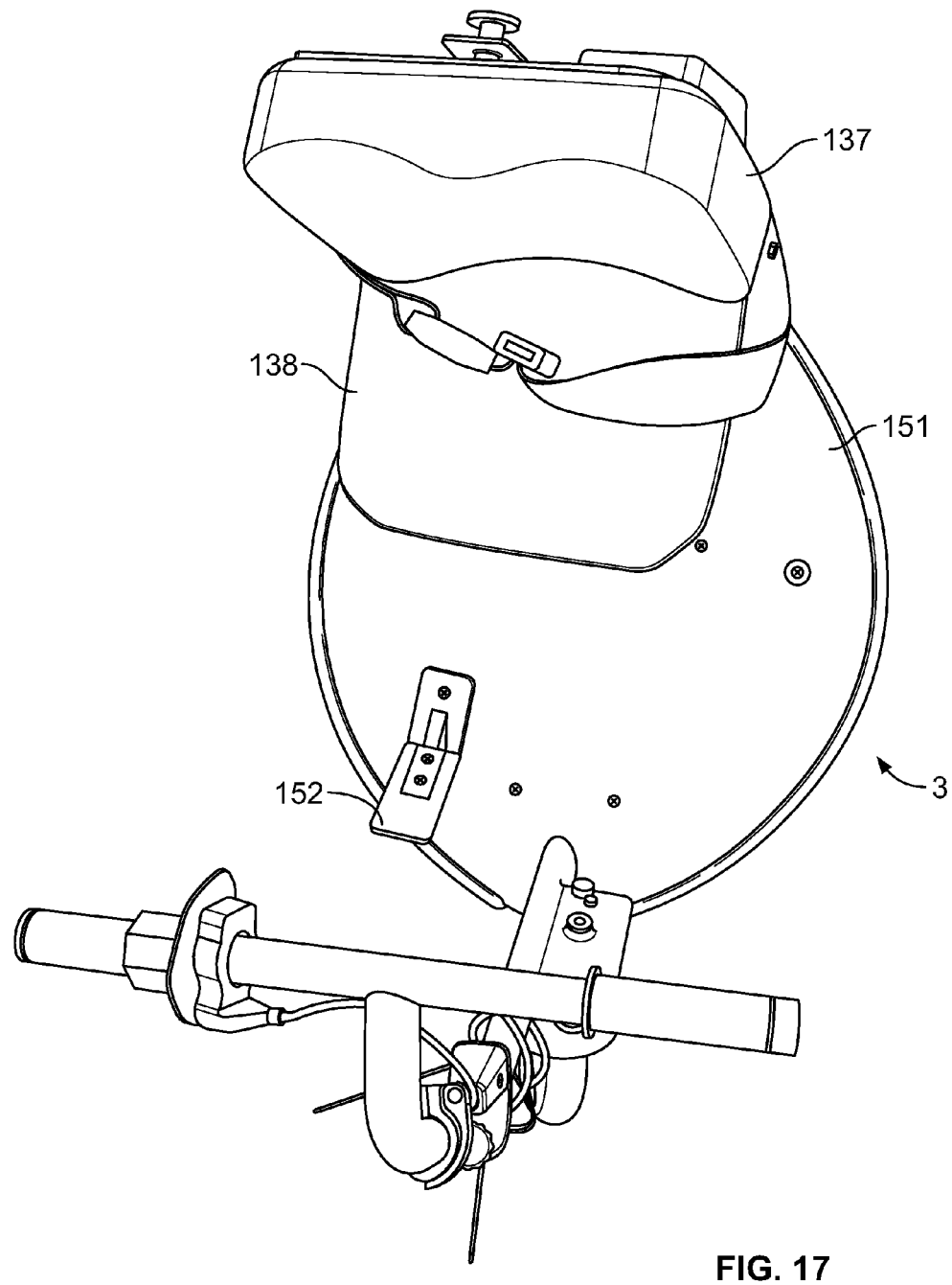
FIG. 17 is a slightly oblique plan view of scooter.

FIG. 16 is an upper front perspective view of the assembled scooter 3, showing handlebar 145, and front fork 147. Seat base 149 provides support for seat post 150, baseplate 151 and brake pedal 152 (FIG. 17). Front tire 60 (FIG. 16) is mounted to the front axle 161. FIG. 10 shows battery 163 mounted on the Razor E200's original scooter frame.

FIG. 16 is an oblique front perspective view of the modified assembled scooter of the present invention, generally designated 3.

FIG. 16 shows platform 106, baseplate 151, handle bars 145, throttle 155, front fork 147, to which is mounted a front wheel and tire 160 on the front axle 161.

FIG. 17 is a plan view of scooter 3, comprising base plate 151, on which is mounted brake pedal 152.

Figure 18:
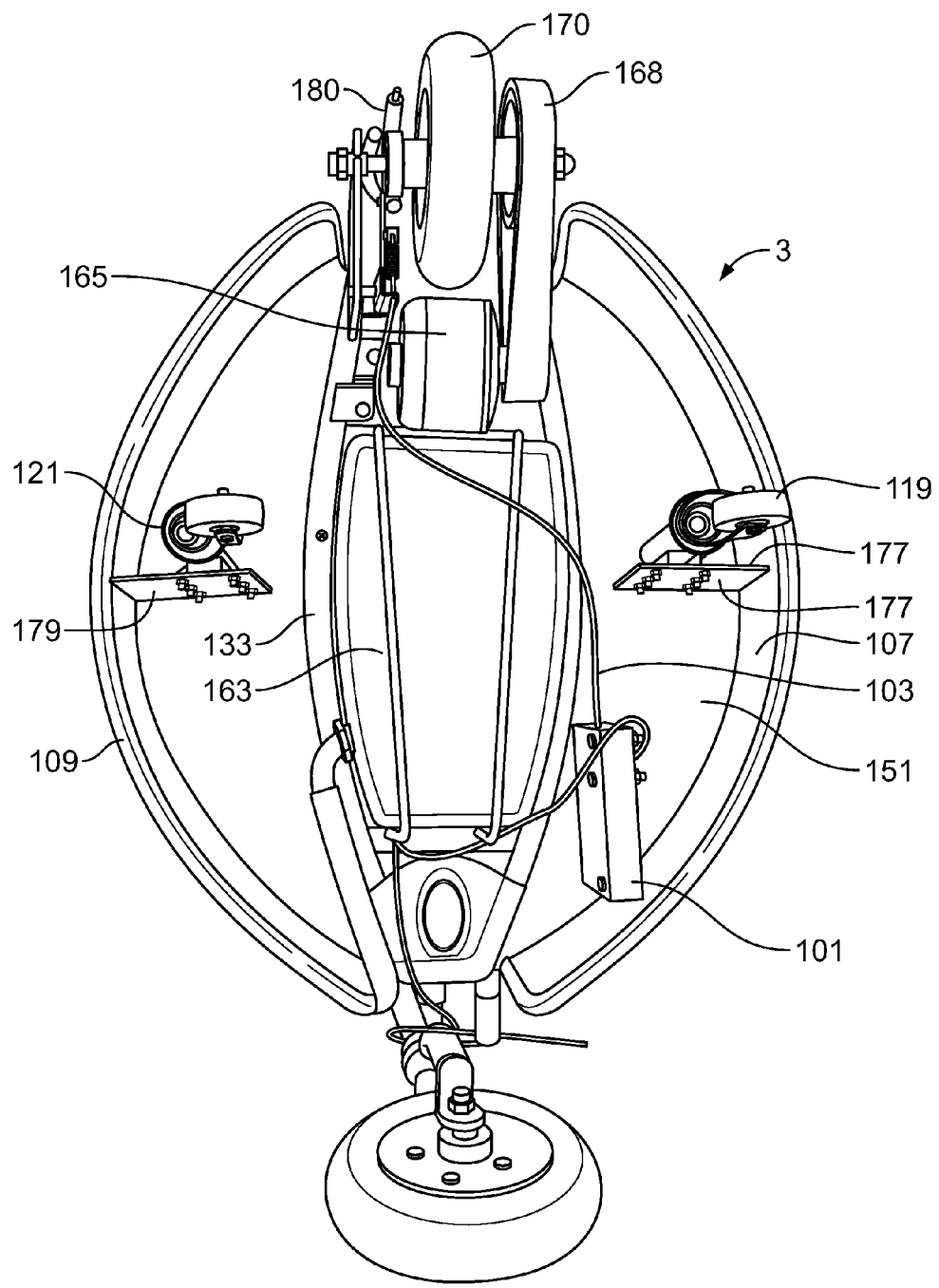
FIG. 18 is a bottom plan view thereof.

FIG. 18 is a perspective view in the nature of a bottom plan view of scooter 3. On frame 133 is mounted a battery 163 and a drive motor 165.

Drive motor 165 drives a drive belt 168, which drives a rear wheel and tire 170. To baseplate 151 is molded side panel 107. A bulkhead 177 is welded at right angles to reinforce the structure and serve as a mount and reinforcing structure for right caster 119.

Left panel 109 is also welded to baseplate 151. A bulkhead 179 is welded at right angles to reinforce the structure and serve as a mount and reinforcing structure for left caster 121.

These casters 119 & 121 provide transverse stability for the handicapped user, who is likely to have less than perfect balance.

Brake assembly 101 is shown mounted to baseplate 151. Brake cable 103, connects foot brake actuator assembly 101 to brake 180, which brakes rear wheel 170.

Figure 19:
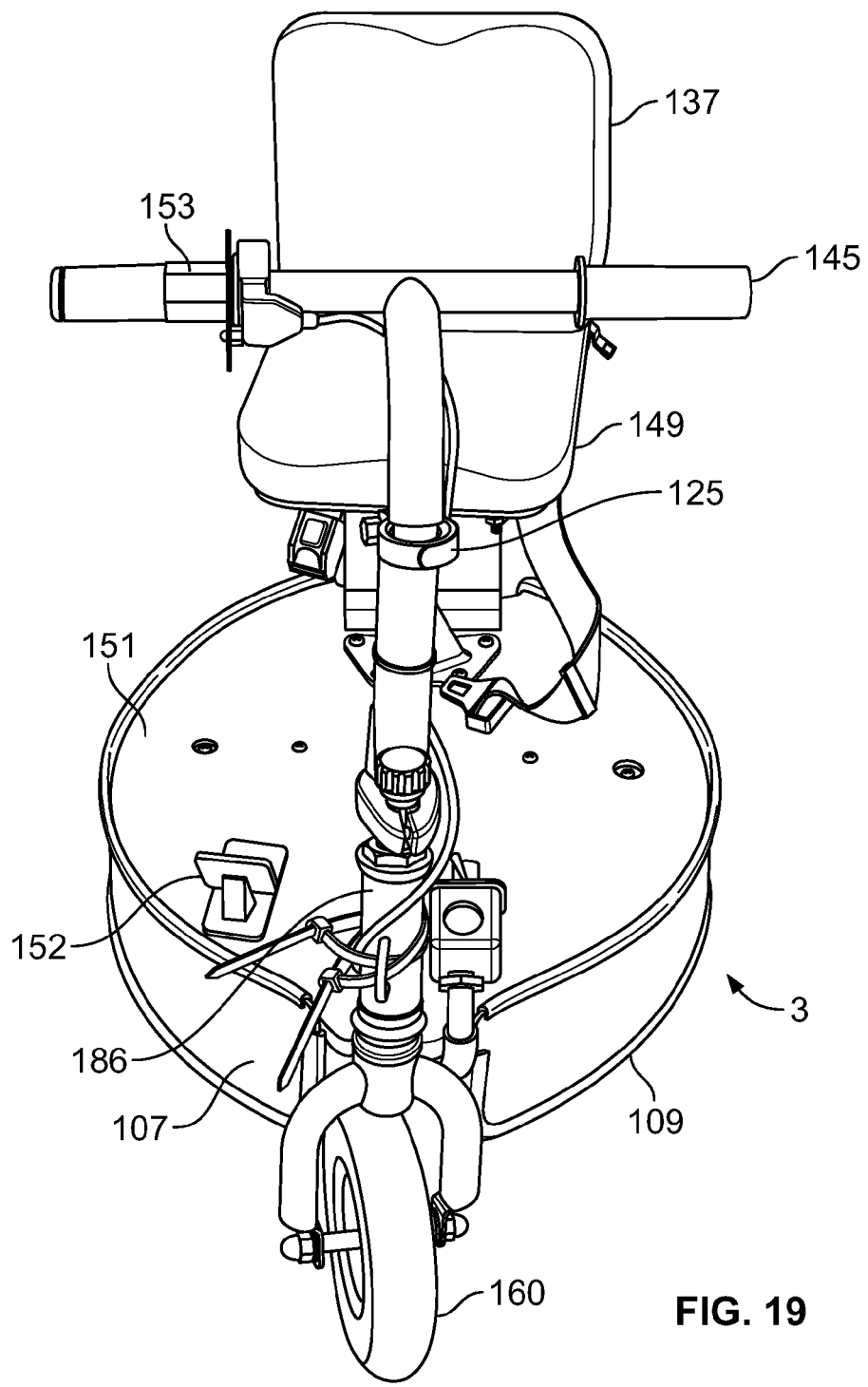
FIG. 19 is a upper frontal perspective view thereof.\

FIG. 19 is a front perspective view of scooter 3. FIG. 19 shows seatback 137, handlebars 145, throttle 153, handlebar height adjuster 125, brake pedal 152, headset 186, and front tire 160.

Figure 20:
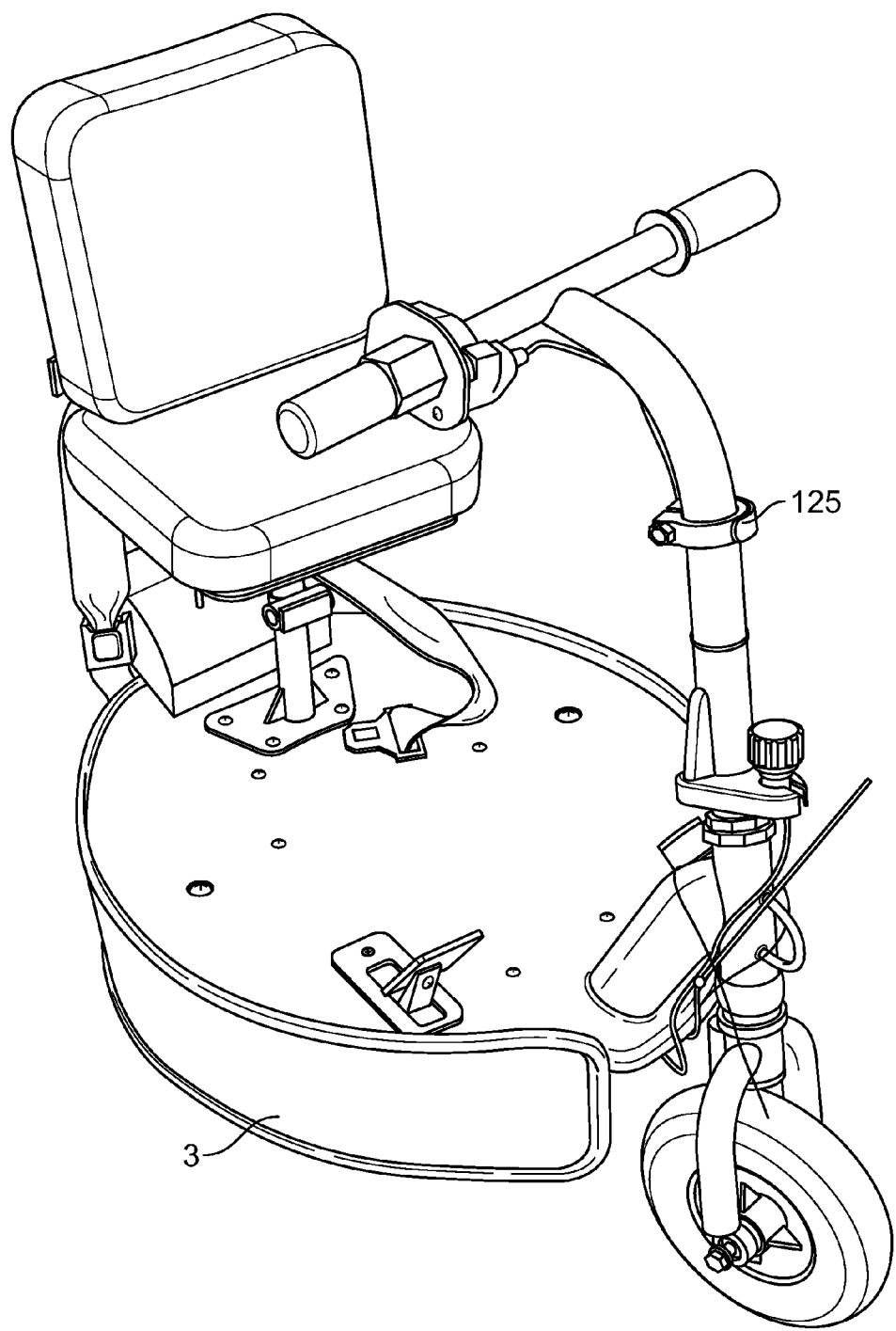
FIG. 20 is an upper right front perspective view thereof.

FIG. 20 is a front right oblique perspective view from above of scooter 3.

Figure 21:
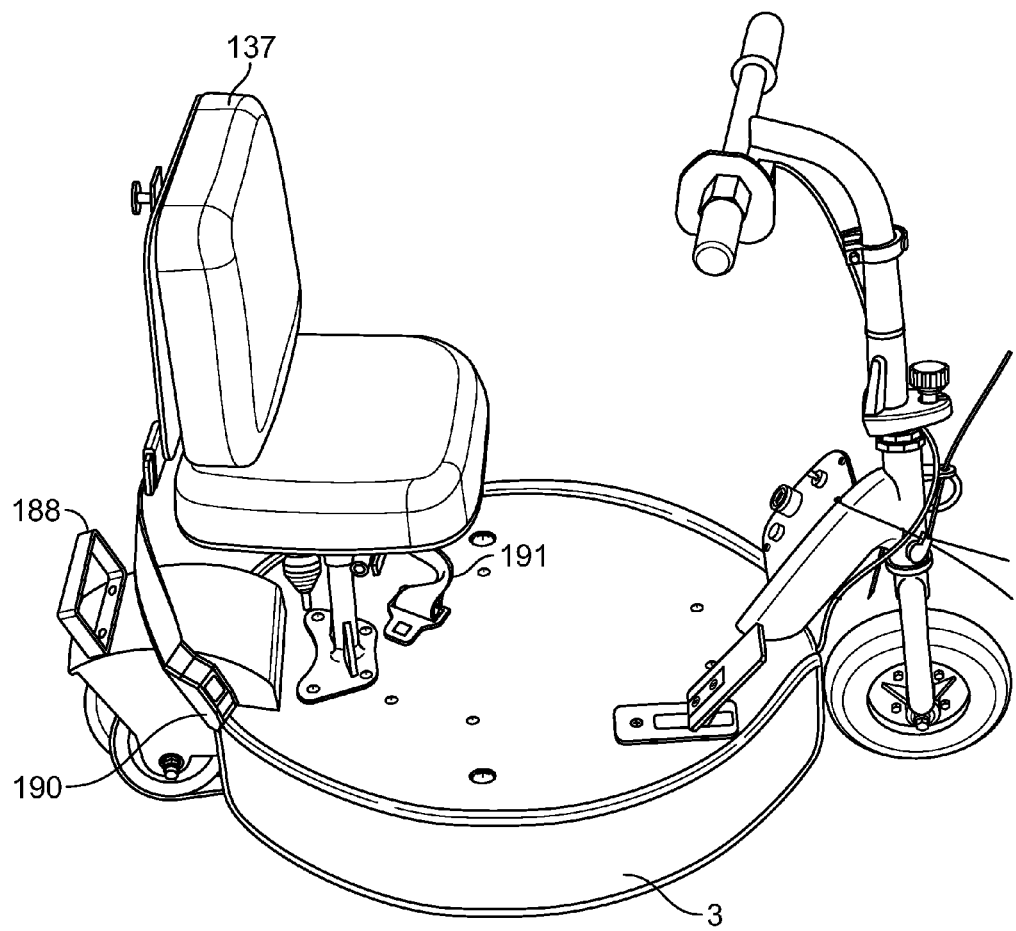
FIG. 21 is an upper right perspective view thereof.

FIG. 21 is a right side perspective view from above of scooter 3. It shows seat back 137, right seatbelt 190, left seat belt 191, and rear handle 188.

Figure 22:
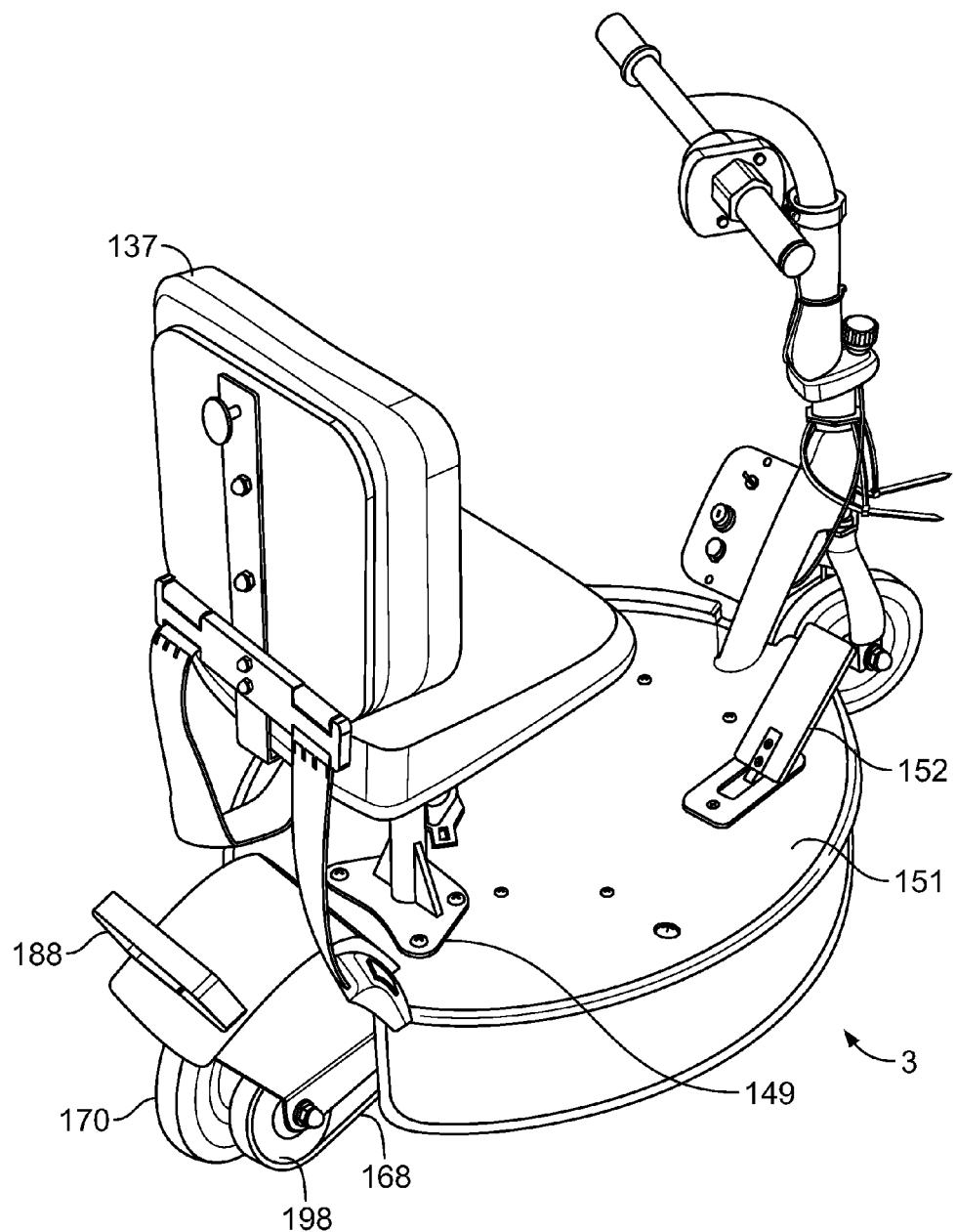
FIG. 22 is an upper right rear perspective view thereof.

FIG. 22 is a right rear oblique perspective view from above of scooter 3. FIG. 22 shows seat back 137, right seatbelt 190, left seat belt 191, and rear handle 188.

FIG. 22 shows seat base 149 and brake pedal 152 mounted to baseplate 151.

Figure 23:
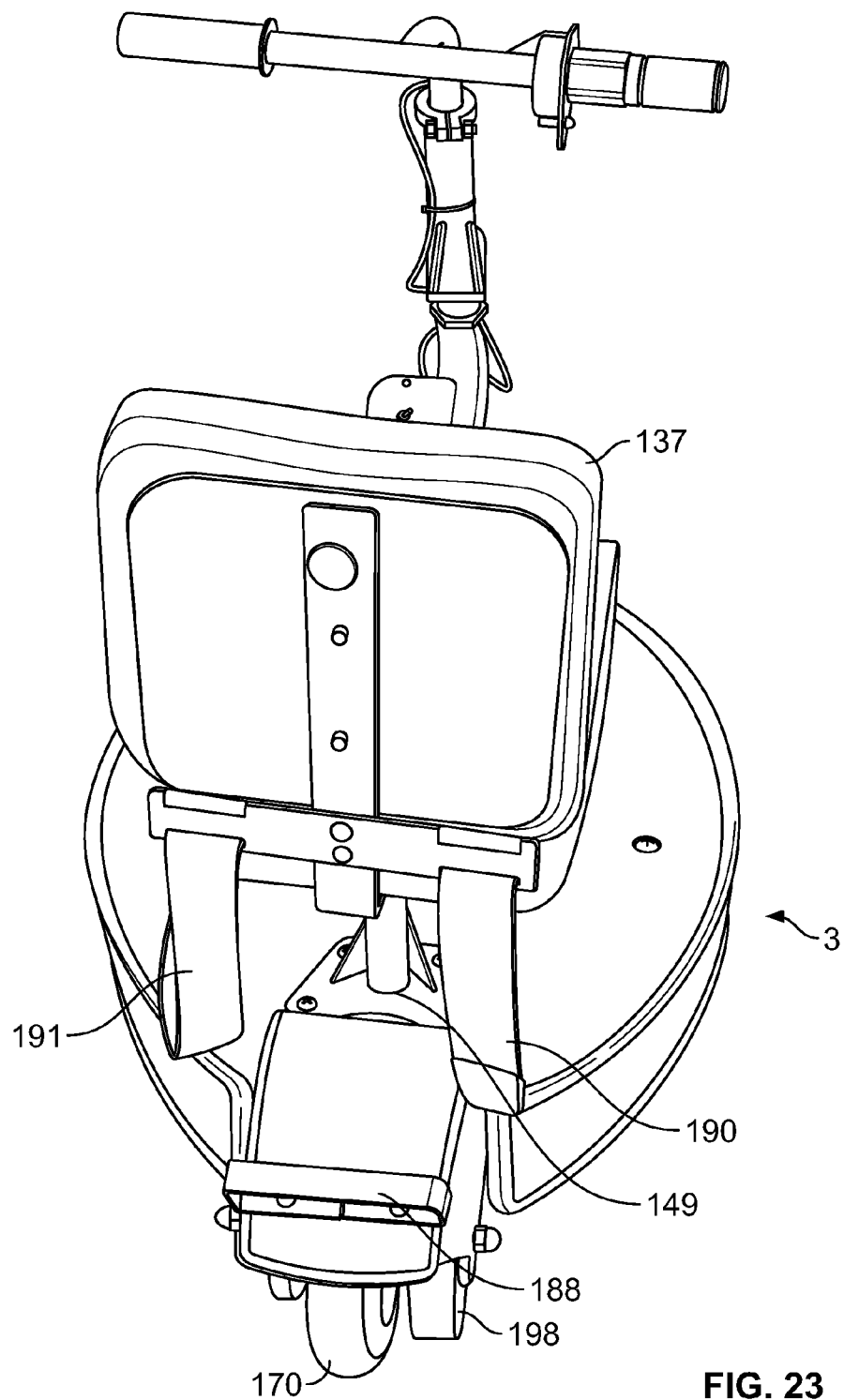
FIG. 23 is an upper rear perspective view thereof.

FIG. 23 is a rear perspective view from above of scooter 3. The mounting means for the seat back 137 is shown in this view. FIG. 23 shows seat base 149.

FIG. 23 shows seat back 137, right seatbelt 190, left seat belt 191, and rear handle 188.

Figure 24:
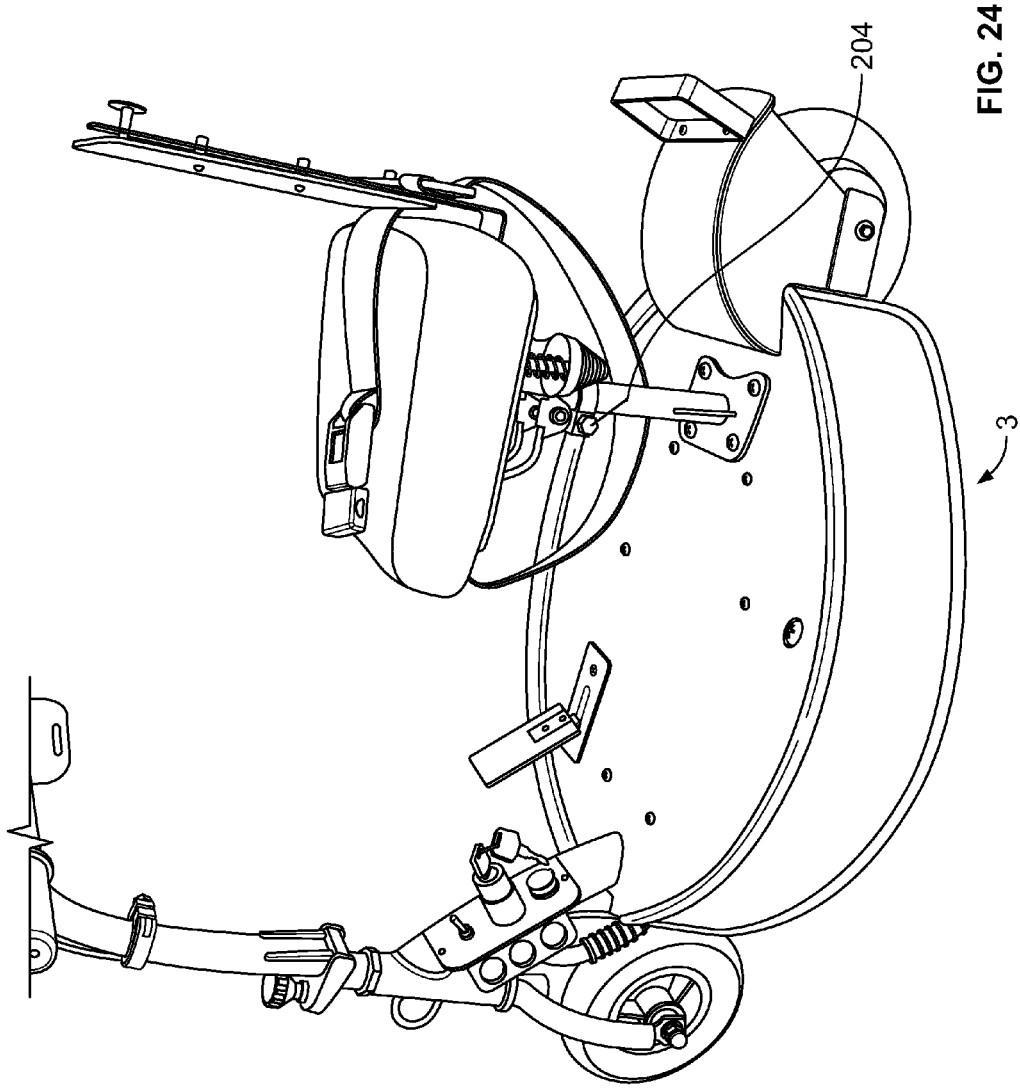
FIG. 24 is an upper left perspective view thereof.

FIG. 24 is a left perspective view of scooter 3, showing a seat height adjuster 204, which is similar to that used on a height-hand-adjustable bicycle seat post.

I claim:

1. A scooter for a handicapped person having feet, said scooter comprising:
    a wide platform;
    a front wheel, steerably mounted at a front of the wide platform;
    a rear drive wheel, mounted at a back of the wide platform;
    a motor, connected to drive the drive wheel;
    a power source for the motor;
    a pair of protective skirts, mounted to the circumferential edges of the wide platform,
    a pair of casters, mounted to and below the wide platform, at lateral edges of the wide platform, at a widest dimension of said platform, within and protected by: the protective skirts;
    said wide platform being a wider base for planting said person's feet than on a conventional scooter, and said wide platform being almost as wide as it is long;
    bulkheads (177 & 179) attaching the wide platform (106) to the protective skirts (114) and to the casters (119 & 121);
    said protective skirts extending nearly to a bottom of the casters, to prevent objects or people from being run over by the casters.

2. A scooter according to claim 1, further comprising:
    an adjustable seat, which positionally adjusts for growth in the person;
    the adjustable seat is mounted atop a seat post;
    the seat post is slidably mounted in a seat post housing;
    the seat post housing comprises a tensioning lever/clamp which: releasably squeezes the housing.

3. A scooter according to claim 2, further comprising:
    a base plate (135), for mounting atop the wide platform;
    said base plate serving as the mount for the seat post housing;
    said base plate having a plurality of screw slots, for fore-and-aft positional adjustment of the seat.

4. A scooter according to claim 1, further comprising:
    a pair of handlebars;
    a handlebar stem having a straight cylindrical segment;
    a stem housing, cooperatively sized to slidably fit the handlebar stem;
    a stem tensioning lever/clamp (125) releasably squeezes the stem housing.

5. A scooter according to claim 3, further comprising:
    a pair of handlebars;
    a handlebar stem having a straight cylindrical segment;
    a stem housing, cooperatively sized to slidably fit the handlebar stem;
    a stem tensioning lever/clamp (125) releasably squeezes the stem housing.

6. A scooter according to claim 5, further comprising:
    a variable speed throttle;
    an adjustable upper limit to the variable speed.

7. A scooter according to claim 6, further comprising:
    a back rest, mounted to the seat, for support for children with poor postural control or weaker postural muscles.

8. A scooter according to claim 7, further comprising:
    a seat belt, mounted to the seat, both for safety and to retain a child on the seat if the child has balance or strength problems.

9. A scooter for a handicapped person having feet, said scooter comprising:
    a wide platform of similar width to length;
    a front wheel, steerably mounted at a front of the wide platform;
    a rear drive wheel, mounted at a back of the wide platform;
    a motor, connected to drive the drive wheel;
    a power source for the motor;
    a pair of protective skirts, mounted to the circumferential edges of the wide platform;
    a pair of casters, mounted below the wide platform, amidships, at lateral edges of the wide platform, within and protected by: the protective skirts;
    said wide platform being a wider base for planting said person's feet than on a conventional scooter, and said wide platform being almost as wide as it is long;
    bulkheads (177 & 179) attaching the wide platform (106) to the protective skirts (114) and to the casters (119 & 121);
    said protective skirts extending nearly to a bottom of the wheels, to prevent objects or people from being run over by the wheels;
    an adjustable seat, which positionally adjusts for growth in the person;
    the adjustable seat is mounted atop a seat post;
    the seat post is slidably mounted in a seat post housing;
    the seat post housing comprises a tensioning lever/clamp which releasably squeezes the housing;
    a base plate (135), for mounting atop the wide platform;
    said base plate serving as the mount for the seat post housing;
    said base plate having a plurality of screw slots, for fore-and-aft positional adjustment of the seat;
    a pair of handlebars;
    a handlebar stem having a straight cylindrical segment;
    a stem housing, cooperatively sized to slidably fit the handlebar stem;
    a stem tensioning lever/clamp (125) releasably squeezes the stem housing, thereby rendering the handlebars vertically adjustable;
    a variable speed throttle;
    an adjustable upper limit to the variable speed;

a back rest, mounted to the seat, for support for children with poor postural control or weaker postural muscles;

a seat belt, mounted to the seat, both for safety and to retain a child on the seat if the child has balance or strength problems.

10. A method of providing mobility to a user by having a disability or a disease, the method comprising: providing the scooter of claim 9, and wherein the disability or disease is one of the following:

Ducheene Muscular Dystrophy;
Muscular Dystrophy;
Cerebral Palsy—mild;
Hypotonia;
Cystic Fibrosis;
Pulmonary Conditions which limit walking;
Cardiac Conditions which limit walking;
Spina Bifida;
SMA;
Paraplegia;
Transverse Myolitis;
Cancer;
Leukemia;
Little People;
Lupus;
Arthrogyroposis;
Epidermolysis Bullosa;
Stroke;
Club Foot or Club Feet.

11. Scooter means for a handicapped person having feet, said scooter means comprising:

a wide platform means for:
resting the feet, and
stabilizing the scooter means;
a steerable front wheel means mounted at a front of the wide platform means;
a rear drive wheel means, mounted at a back of the wide platform means;
a motor means, connected to drive the drive wheel means;
a power source for the motor means;
protective skirt means for protecting external objects from the caster means, said protective skirt means mounted to the sides of the wide platform means;
caster means for cooperating with said wide platform means to stabilize the scooter means;
bulkhead means, for mounting the caster means amidships, and for reinforcing the wide platform means to the skirt means;
said wide platform means being wide;
said skirt means extending nearly to a bottom of the caster means, to prevent external objects from being run over by the wheels;
an adjustable seat means, for accommodating growth in the person, said an adjustable seat means comprising:
a seat mounted atop a seat post means;
the seat post means is slidably mounted in a seat post housing;
the seat post housing comprises a tensioning lever means for releasably squeezing the seat post housing and vertically adjusting the seat;
a base plate means (135):
for mounting the seat post housing atop the wide platform means, and
or fore-and-aft positional adjustment of the seat means;
a pair of handlebars;
a handlebar stem means for mounting the pair of handlebars;
stem housing means for adjustably mounting the handlebar stem means;
stem lever means for releasably squeezing the stem housing, and for thereby vertically adjusting the handlebars;
a variable speed throttle;
means for adjusting an upper limit to the variable speed throttle;
a back rest means for supporting said handicapped person despite poor postural control or weaker postural muscles;
a seat belt means, mounted to the seat, for safety and for retaining the handicapped person on the seat despite balance or strength problems.

* * * * *